(12) United States Patent
Sia, Jr. et al.

(10) Patent No.: US 7,758,066 B2
(45) Date of Patent: Jul. 20, 2010

(54) REAR PILLAR GARNISH ASSEMBLY

(75) Inventors: Generoso Sia, Jr., Plain City, OH (US);
Ruben E. Guanzon, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/415,455

(22) Filed: Mar. 31, 2009

(65) Prior Publication Data
US 2009/0250911 A1 Oct. 8, 2009

Related U.S. Application Data

(60) Provisional application No. 61/042,510, filed on Apr. 4, 2008.

(51) Int. Cl.
*B60R 21/16* (2006.01)
(52) U.S. Cl. ............... 280/728.2; 280/728.3; 280/730.2
(58) Field of Classification Search ............... 280/728.2, 280/728.3, 730.2
See application file for complete search history.

(56) References Cited

U.S. PATENT DOCUMENTS

| | | | |
|---|---|---|---|
| 5,791,683 A | 8/1998 | Shibata et al. | |
| 6,328,333 B1 | 12/2001 | Patel et al. | |
| 6,565,117 B2 * | 5/2003 | Kubota et al. | 280/730.2 |
| 6,672,027 B2 | 1/2004 | Mizutani et al. | |
| 6,694,036 B2 | 2/2004 | Makino | |
| 6,719,321 B2 * | 4/2004 | Yasuhara et al. | 280/730.2 |
| 7,021,698 B2 | 4/2006 | Yamada et al. | |
| 7,025,377 B2 * | 4/2006 | Ryu | 280/730.2 |
| 7,040,649 B2 | 5/2006 | Totani et al. | |
| 7,118,153 B2 | 10/2006 | Kitayama et al. | |
| 7,168,757 B2 | 1/2007 | Futatsuhashi | |
| 7,188,861 B2 | 3/2007 | Ono | |
| 7,188,863 B2 | 3/2007 | Tiesler et al. | |
| 7,246,465 B2 | 7/2007 | Staser | |
| 7,313,247 B1 | 12/2007 | Tilli et al. | |
| 7,322,601 B2 * | 1/2008 | Bertossi | 280/730.2 |
| 2001/0005469 A1 | 6/2001 | Pyun | |
| 2002/0125693 A1 * | 9/2002 | Alsup et al. | 280/730.2 |
| 2007/0164585 A1 | 7/2007 | Hasegawa et al. | |
| 2007/0210561 A1 | 9/2007 | Yamagiwa et al. | |
| 2007/0228700 A1 * | 10/2007 | Yamagiwa et al. | 280/730.2 |
| 2008/0073888 A1 * | 3/2008 | Enriquez | 280/730.2 |
| 2008/0197609 A1 * | 8/2008 | Jaramillo et al. | 280/730.2 |

FOREIGN PATENT DOCUMENTS

WO 2008/029253 3/2008

* cited by examiner

*Primary Examiner*—Toan C To
(74) *Attorney, Agent, or Firm*—Mark E. Duell; Rankin Hill & Clark LLP

(57) ABSTRACT

A rear pillar garnish assembly to cover an air bag in a rear pillar for an automotive vehicle is provided and includes a base attached to the rear pillar, a flexible cover attached to a front portion of the base, a stiffener attached to the flexible lid and to the rear pillar, a speaker assembly, and a rear cover. When the air bag deploys the force of the air bag dislodges the flexible cover from the front portion of the base to allow the air bag to expand into a passenger compartment of the automotive vehicle. The flexible lid, however, remains attached to the stiffener thereby preventing the flexible lid from becoming airborne into the passenger compartment of the automotive vehicle.

10 Claims, 5 Drawing Sheets

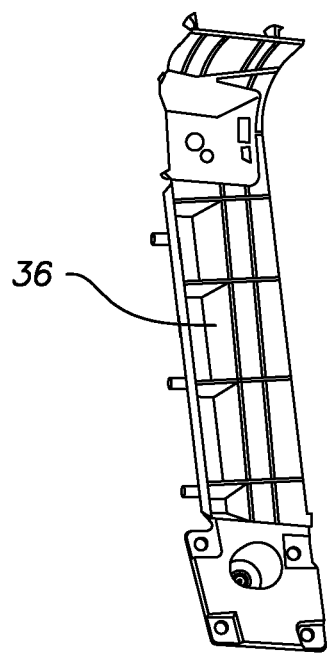
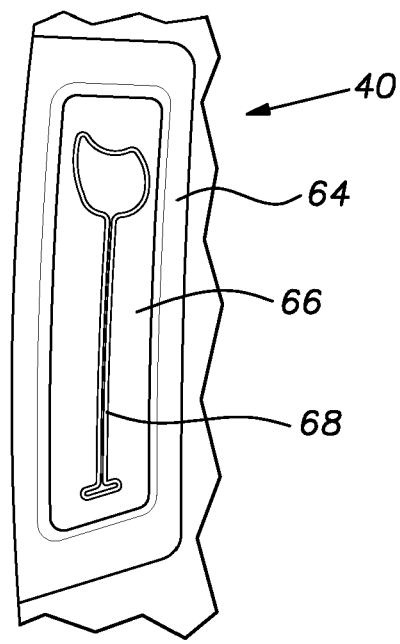
FIG. 9      FIG. 10
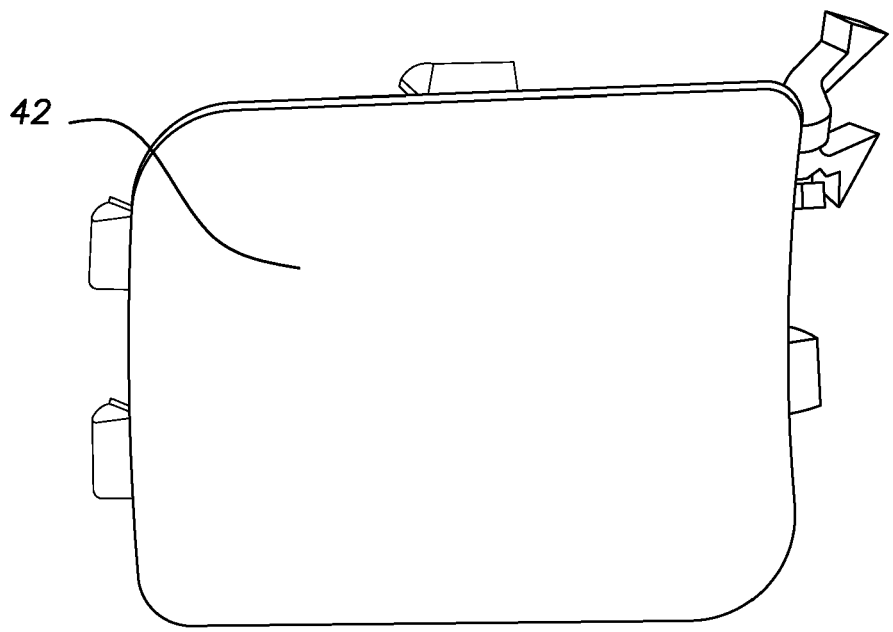
FIG. 11

000
REAR PILLAR GARNISH ASSEMBLY

FIELD OF THE INVENTION

The present invention relates to a rear pillar for an automotive vehicle. More specifically, the present invention relates to a rear pillar garnish assembly to cover the rear pillar and multiple components mounted on the rear pillar.

BACKGROUND

A rear pillar garnish or trim panel provides a decorative and protective means to cover multiple components, such as a small motor, wiring harnesses, clips, speakers, etc., mounted on a rear pillar of an automotive vehicle. These components, however, typically did not include an air bag. Conventional side curtain air bags extend longitudinally along a side roof rail but did not extend downwardly into the rear pillar. Thus, conventional rear pillar garnish assemblies were not designed to house an air bag. Specifically, the conventional rear pillar garnish assembly was not designed to effectively provide a release means for the air bag upon deployment.

Thus, what is required is a rear pillar garnish assembly that upon deployment of an air bag allows the air bag to expand into a passenger compartment of an automotive vehicle while preventing the other portions of the rear pillar garnish assembly to become airborne in the passenger compartment.

SUMMARY

In accordance with one aspect, the present invention overcomes the above mentioned disadvantages by providing a rear pillar garnish assembly to cover an air bag in a rear pillar for an automotive vehicle. The rear pillar assembly includes a base operatively attached to the rear pillar, a flexible cover removably attached to a front portion and to a side wall of the base, and a stiffener operatively attached to the flexible lid and to the rear pillar. Upon deployment of the air bag the force of the air bag dislodges the flexible cover from the front portion and the side wall of the base to thereby allow the air bag to expand into a passenger compartment of the automotive vehicle. In addition, the flexible lid remains attached to the stiffener thereby preventing the flexible lid from becoming airborne into the passenger compartment of the automotive vehicle.

In accordance with another aspect, the present invention provides a speaker assembly operatively attached to the base and a rear cover operatively attached to a rear wall of the base. A power tailgate rod is operatively attached to the rear pillar and extends from the rear pillar through an elongated-vertical opening defined in the rear cover and attaches to a tailgate of the automotive vehicle.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 9 is a perspective view of a stiffener of the rear pillar garnish assembly of FIG. 4.

FIG. 10 is a perspective view of a power tailgate rod exit cover of the rear pillar garnish assembly of FIG. 4.

FIG. 11 is a perspective view of a bolt cover of the rear pillar garnish assembly of FIG. 4.

DETAILED DESCRIPTION

Figure 1:
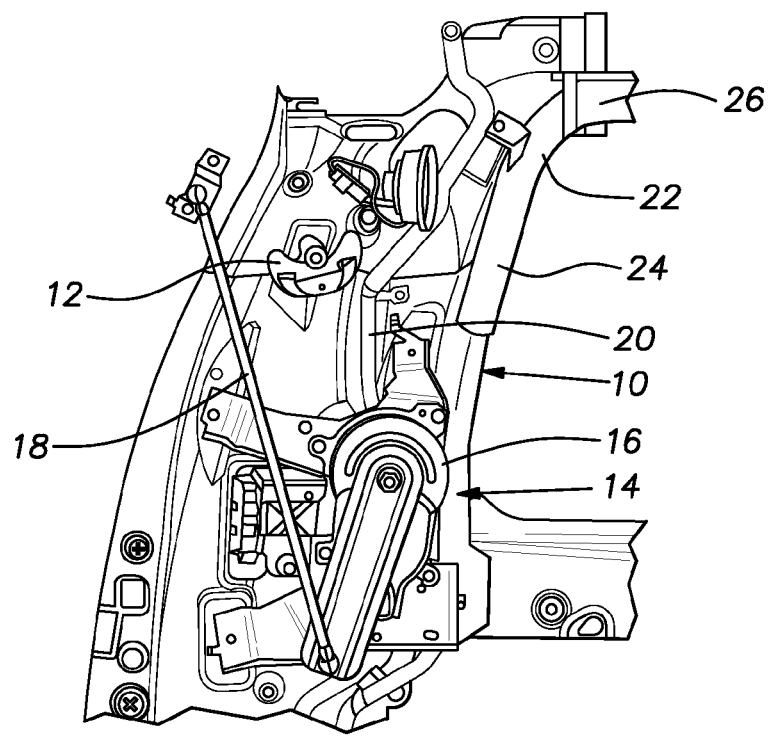
FIG. 1 is a side view of a rear pillar showing the location of components.

Referring now to the drawings, FIG. 1 shows a rear pillar 10 for an automotive vehicle. Typically, the rear pillar 10 in automotive vehicles house multiple components including, but not limited to, a seat belt D-ring 12, a power tailgate assembly 14 comprised of a power tailgate motor 16 and a power tailgate rod 18, electrical wire harnesses 20, and a side curtain air bag 22. It should be noted that only a vertical portion 24 of the side curtain air bag 22 extends downward along the rear pillar 10. A horizontal portion 26 of the side curtain air bag 22 extends longitudinally in a forward direction along a side roof rail of the vehicle.

Figure 2:
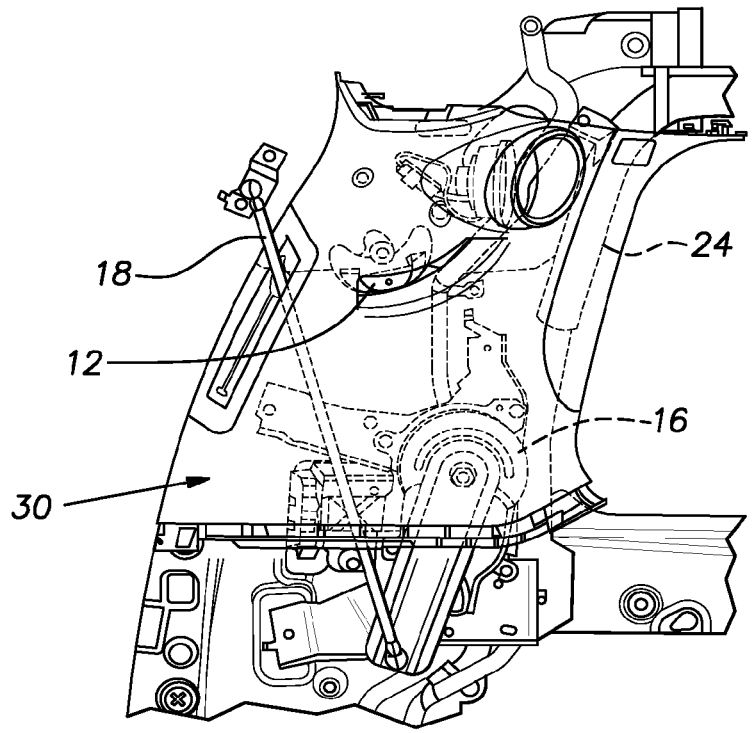
FIG. 2 is a side view of the rear pillar showing a rear pillar garnish assembly superimposed over the rear pillar.

FIG. 2 shows a rear pillar garnish assembly 30 (hereinafter garnish assembly 30) superimposed over the rear pillar 10. The garnish assembly 30 in FIG. 2 is shown in this fashion to illustrate how the garnish assembly 30 attaches to the rear pillar 10 thereby providing a protective cover for the above mentioned components. When the side curtain air bag 22 deploys due to an external force the garnish assembly 30 performs such that the air bag 22 expands into a passenger compartment of the automotive vehicle while other portions of the garnish assembly 30 remain intact and do not become airborne in the passenger compartment.

Referring to FIGS. 2-5, the garnish assembly 30 includes a base 32, a flexible lid 34, a stiffener 36, a speaker assembly 38, and a rear cover 40. The garnish assembly 30 further includes a bolt cap 42 shown in FIG. 11.

The base 32 is the main component of the garnish assembly 30 and is made of a rigid plastic material of the type commonly known in the art. The base 32 attaches to the rear pillar 10 by any means commonly known in the art and covers the D-ring 12, the power tailgate motor 16, a portion of the power tailgate rod 18, and the electrical wire harnesses 20. The base 32 includes a front portion 44, a side wall 46 and a rear wall 48. The front portion 44 of the base 32 does not extend the full height of the base 32 as do the side 46 and rear 48 walls. An arc shaped opening 50 is defined near a central portion of the side wall 46 of the base 32. Although not shown in the figures, a seat belt harness extends from the D-ring 12 and through the arc shaped opening 50 to allow an occupant to secure the seat belt harness to a seat belt buckle. A circular shaped opening 52 is defined near a top of the side wall 46 of the base 32. The circular shaped opening 52 receives a portion of the speaker assembly 38, as will be explained further below. A rectangular shaped 53 opening is defined in the rear wall 48 of the base 32. The rectangular shaped opening receives the rear cover 40, as will be explained further below.

Referring to FIGS. 2-6, the flexible lid 34 is made from a flexible material and is generally rectangular in shape. A bottom edge 35 of the flexible lid 34 attaches to a top edge 45 of the front portion 44 and a rear edge 37 of the flexible lid 34 attaches to a front edge 47 of the side wall 46 such that the flexible lid 34 essentially closes off the front of the base 32. In other words, the front portion 44 and the flexible lid 34 together form a front wall 54 of the base 32. Thus, The flexible lid 34, when attached to the front portion 44 of the base 32 covers the vertical portion 24 the side curtain air bag 22. Upon deployment of the side curtain air bag 22 the flexible lid 34 easily flexes or bends out of the way due to the force of the side curtain air bag 22 to thereby allow the side curtain air bag 22 to expand into the passenger compartment, as will be explained in more detail further below.

Figure 4:
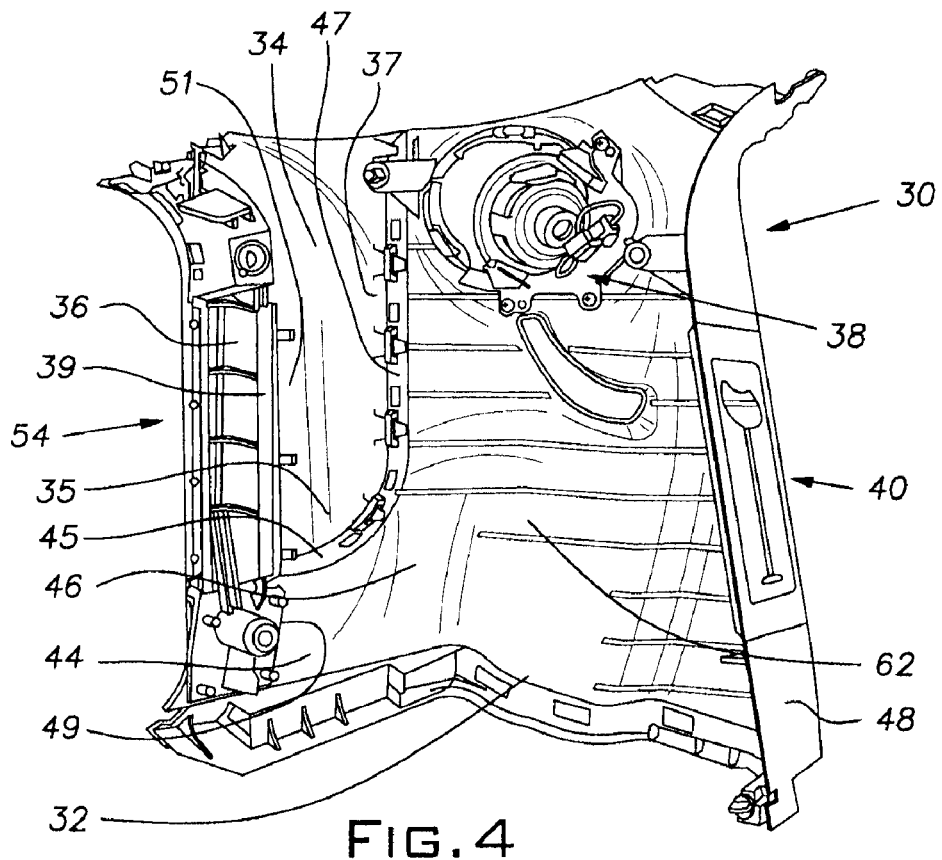
FIG. 4 is a perspective rear view of the rear pillar garnish assembly in an assembled state.
Figure 5:
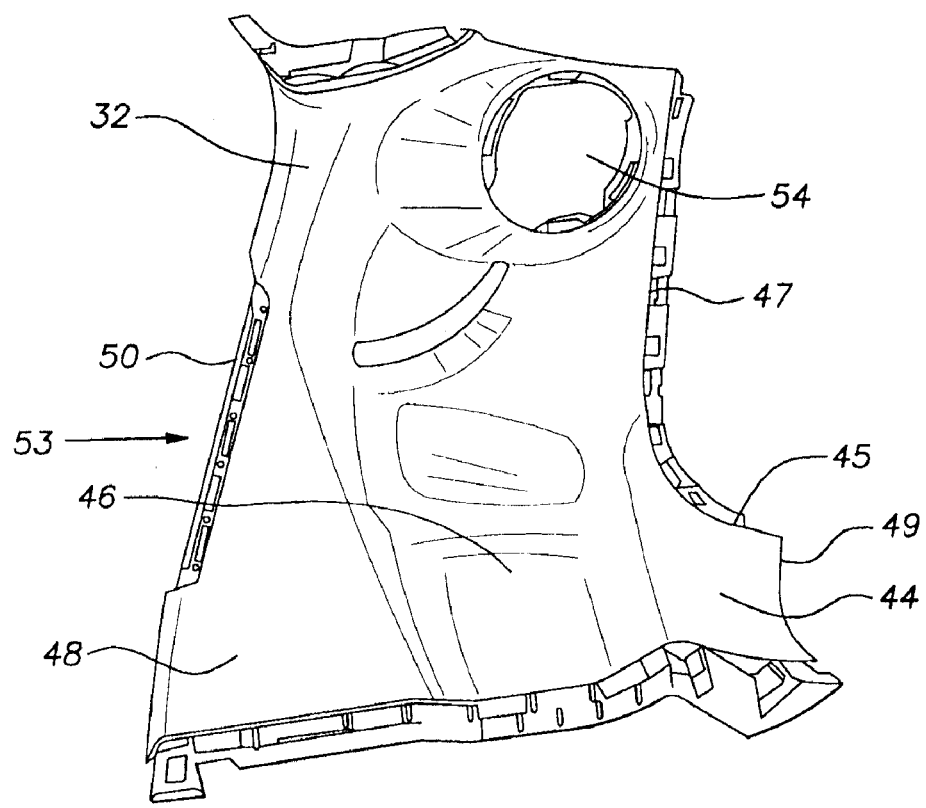
FIG. 5 is a perspective front view of a base of the rear pillar garnish assembly of FIG. 4.
Figure 6:
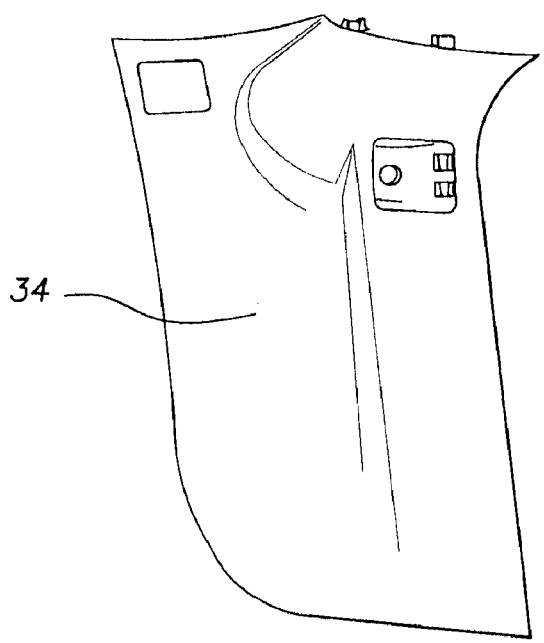
FIG. 6 is a perspective front view of a lid of the rear pillar garnish assembly of FIG. 4.

Referring to FIGS. 4, 5 and 9, the stiffener 36 provides a connection between the front wall 54 of the base 32 and the rear pillar 10. Specifically, a first edge 39 of the stiffener 36 attaches to a rear edge 49 of the front portion 44 and a rear edge 51 of the flexible lid 34. In addition, a second edge 41 of the stiffener 36 attaches to the rear pillar 10 adjacent to the vertical portion 24 of the side curtain air bag 22. Thus, the stiffener 36 secures the front wall 54 of the base 32 to the rear pillar 10. When the side curtain air bag 22 deploys the stiffener 36 prevents the flexible lid 34 from becoming detached and becoming airborne, as will be explained further below.

Figure 7:
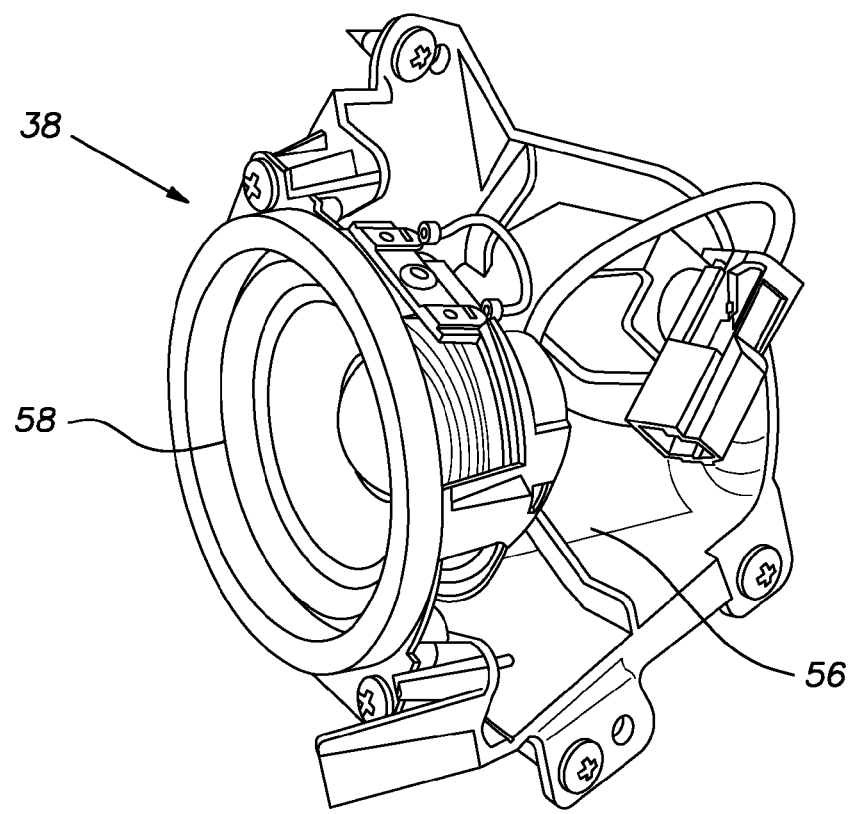
FIG. 7 is a perspective view of a speaker and speaker bracket of the rear pillar garnish assembly of FIG. 4.
Figure 8:
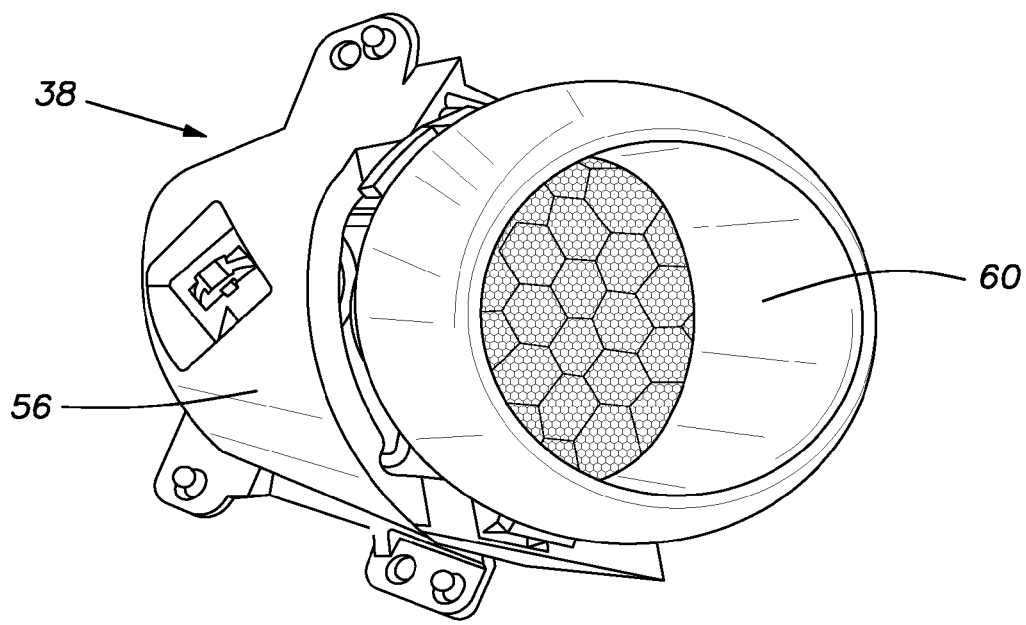
FIG. 8 is a perspective view of a speaker grill attached to the speaker bracket of the rear pillar garnish assembly of FIG. 4.

Referring to FIGS. 4, 7 and 8, the speaker assembly 38 includes a speaker bracket 56, a speaker 58, and a speaker grille 60. The speaker 58 attaches to the speaker bracket 56, which is attached to a rear surface 62 of the side wall 46, as shown in FIG. 4. The speaker bracket 56 is attached to the side wall 46 such that the speaker 58 is aligned with the circular shaped opening 52 defined in the side wall 46. The speaker grille 60 attaches to a perimeter of the circular shaped opening 52, thereby covering the speaker 58. The speaker grille 60 is easily removable from the side wall 46 to thereby allow easy access to the speaker 58 for maintenance purposes.

Figure 3:
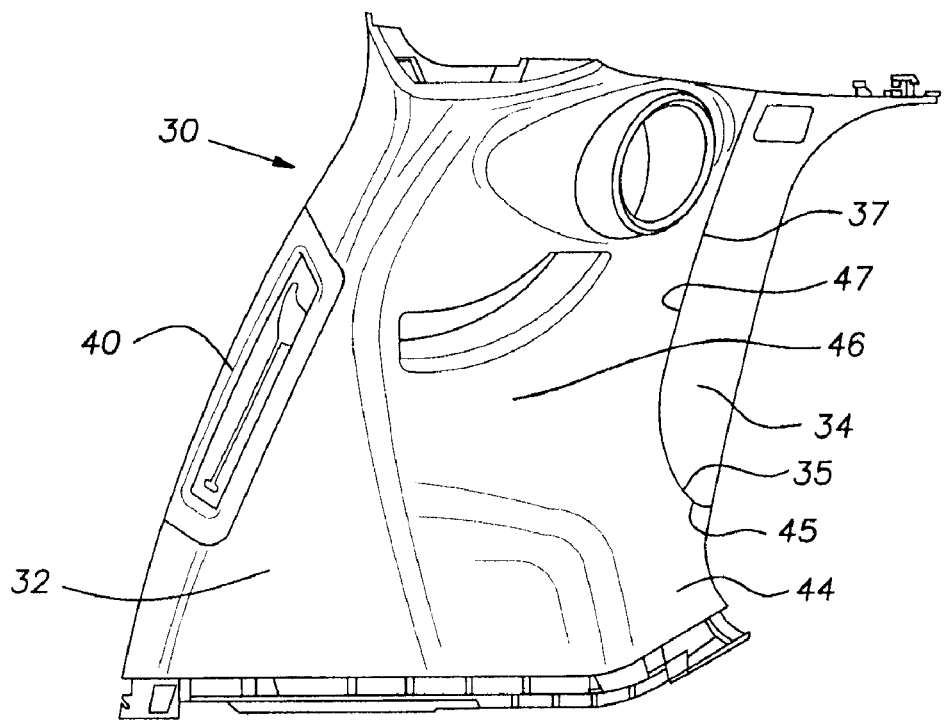
FIG. 3 is a perspective front view of the rear pillar garnish assembly in an assembled state.

Referring to FIGS. 3, 4 and 10, the rear cover 40 is comprised of a rectangular shaped plastic frame 64 and a flexible-rubber material 66 attached to an inside portion of the plastic frame 64. The rear cover 40 attaches to a perimeter of the rectangular shaped opening 53 defined in the rear wall 48 of the base 32, as shown in FIG. 4. Preferably, the rear cover 40 snaps to the rear wall 48 so that the rear cover 40 can be easily removed for maintenance purposes. An elongated-vertical opening 68 is defined in the flexible-rubber material 66 to allow the power tailgate rod 18 to extend from the power tailgate motor 16 and through the rear cover 40 to thereby attach to the tailgate of the vehicle. During operation of the power tailgate assembly 14, the flexible-rubber material 66 flexes such that the rear cover 40 does not inhibit the motion of the power tailgate rod 18.

Referring to FIG. 11, the bolt cap 42 simply covers a bolt (not shown) that secures the front of the base 32 to the interior of the vehicle.

The garnish assembly 30 described above performs several functions. First, the garnish assembly 30 provides a protective cover for the components described above. Second, the garish assembly 30 has easily removable parts, such as the speaker grille 60 and the rear cover 40 to allow easy access to the speaker 58 and the power tailgate assembly 14 for maintenance purposes. Third, the garnish assembly 30 performs such that the upon deployment of the side curtain air bag 22, the flexible lid 34 flexes or bends out of the way due to the force of the side curtain air bag 22 to allow the side curtain air bag 22 to expand into the passenger compartment. Specifically, when the side curtain air bag 22 deploys, the force of the air bag 22 causes the flexible lid 34 to release or dislodge from both the top edge 45 of the front portion 44 and the front edge 47 of the side wall 46. The rear edge 51 of the flexible lid 34, however, remains attached to the stiffener 36. Thus, when the side curtain air bag 22 deploys, the flexible lid 34 pivots or bends about an axis on or near where the rear edge 51 of the flexible lid 34 and the stiffener 36 are connected. Therefore, the flexible lid 34 pivots or bends out of the way of the side curtain air bag 22 to allow the side curtain air bag 22 to expand into the passenger compartment. The flexible lid 34, however, remains attached and does not become airborne into the passenger compartment. Further, because the flexible lid 34 flexes out of the way to allow deployment of the side curtain air bag 22 no other parts of the garnish assembly 30 break away and become airborne inside the vehicle.

What is claimed is:

1. A rear pillar garnish assembly to cover an air bag in a rear pillar for an automotive vehicle comprising:
   a base operatively attached to the rear pillar;
   a flexible lid removably attached to a front portion and to a side wall of the base; and
   a stiffener operatively attached to the flexible lid and to the rear pillar,
   wherein upon deployment of the air bag the force of the air bag dislodges the flexible cover from the front portion and the side wall of the base to thereby allow the air bag to expand into a passenger compartment of the automotive vehicle, and
   wherein the flexible lid remains attached to the stiffener thereby preventing the flexible lid from becoming airborne into the passenger compartment of the automotive vehicle.

2. The rear pillar assembly of claim 1, wherein the stiffener includes a first edge and a second edge, wherein the first edge of the stiffener is operatively attached to a rear edge of the flexible lid and to a rear edge of the front portion, and wherein the second edge is operatively attached to the rear pillar.

3. The rear pillar assembly of claim 2 further comprising:
   a speaker assembly operatively attached to the base; and
   a rear cover operatively attached to a rear wall of the base,
   wherein a power tailgate rod is operatively attached to the rear pillar and extends from the rear pillar through an elongated-vertical opening defined in the rear cover and attaches to a tailgate of the automotive vehicle.

4. The rear pillar assembly of claim 3, wherein the rear cover includes a rectangular shaped frame attached to a perimeter of a rectangular shaped opening defined in the rear wall of the base and a flexible-rubber material attached to an inside portion of the rectangular shaped frame, and wherein the elongated-vertical opening is defined in the flexible-rubber material.

5. The rear pillar assembly of claim 4, wherein the speaker assembly includes a bracket, a speaker, and a grille, wherein the speaker is attached to the bracket and the bracket is attached a rear surface of the side wall of the base such that the speaker is aligned with a circular opening defined in the side wall, and wherein the grille is removably attached to a perimeter of the opening to cover the speaker.

6. A rear pillar for an automotive vehicle comprising:
   a rear pillar assembly, the rear pillar assembly including:
      a base operatively attached to the rear pillar;
      a flexible lid removably attached to a front portion and to a side wall of the base; and
      a stiffener operatively attached to the flexible lid and to the rear pillar, wherein the rear pillar houses an air bag and a power tailgate assembly, wherein the rear pillar assembly covers the air bag and the power tailgate assembly, wherein upon deployment of the air bag the force of the air bag dislodges the flexible cover from the front portion and the side wall of the base to thereby allow the air bag to expand into a passenger compartment of the automotive vehicle, and wherein the flexible lid remains attached to the stiffener thereby preventing the flexible lid from becoming airborne into the passenger compartment of the automotive vehicle.

7. The rear pillar of claim 6, wherein the stiffener includes a first edge and a second edge, wherein the first edge of the stiffener is operatively attached to a rear edge of the flexible lid and to a rear edge of the front portion, and wherein the second edge is operatively attached to the rear pillar.

8. The rear pillar of claim 7, wherein the rear pillar assembly further includes:

a speaker assembly operatively attached to the base; and
a rear cover operatively attached to a rear wall of the base, wherein a power tailgate rod is operatively attached to the rear pillar and extends from the rear pillar through an elongated-vertical opening defined in the rear cover and attaches to a tailgate of the automotive vehicle.

9. The rear pillar of claim 8, wherein the rear cover includes a rectangular shaped frame attached to a perimeter of a rectangular shaped opening defined in the rear wall of the base and a flexible-rubber material attached to an inside portion of the rectangular shaped frame, and wherein the elongated-vertical opening is defined in the flexible-rubber material.

10. The rear pillar of claim 9, wherein the speaker assembly includes a bracket, a speaker, and a grille, wherein the speaker is attached to the bracket and the bracket is attached a rear surface of the side wall of the base such that the speaker is aligned with a circular opening defined in the side wall, and wherein the grille is removably attached to a perimeter of the opening to cover the speaker.

* * * * *